United States Patent [19]
Lohraff

[11] Patent Number: 4,625,623
[45] Date of Patent: Dec. 2, 1986

[54] BRAKE BOOSTER

[75] Inventor: Larry G. Lohraff, Berrien Springs, Mich.

[73] Assignee: Allied Corporation, Morristown, N.J.

[21] Appl. No.: 626,257

[22] Filed: Jun. 29, 1984

[51] Int. Cl.$^4$ .............................................. F15B 9/10
[52] U.S. Cl. ..................................... 91/368; 60/547.1;
137/625.25; 137/625.68
[58] Field of Search .............................. 60/548, 547.1;
137/625.25, 625.68; 91/368, 376; 251/174

[56] References Cited

U.S. PATENT DOCUMENTS

| 95,868 | 10/1869 | Allen | 137/625.25 |
| 566,501 | 8/1896 | Cook | 137/625.25 |
| 2,998,828 | 9/1961 | Hare | 137/625.25 |
| 3,324,888 | 6/1967 | Henderson | 137/625.68 |
| 3,370,611 | 2/1968 | Flint | 137/625.25 |
| 3,530,893 | 9/1970 | Masuda | 137/625.25 |
| 3,595,274 | 7/1971 | Faisandier | 137/625.25 |
| 3,763,891 | 10/1973 | Stiltner | 137/625.68 |
| 4,362,086 | 12/1982 | Runkle | 60/547.1 |
| 4,387,569 | 6/1983 | Flory | 60/548 |
| 4,513,783 | 4/1985 | Inoue | 137/625.64 |

Primary Examiner—Abraham Hershkovitz
Attorney, Agent, or Firm—Ken C. Decker

[57] ABSTRACT

A brake booster includes a valve assembly to control communication of fluid pressure to a pressure chamber for the purpose of providing a power assist during braking. The valve assembly comprises a plate-like member cooperating with a pair of cylinders to selectively charge and vent fluid pressure through passages defined by the cylinders.

4 Claims, 4 Drawing Figures

BRAKE BOOSTER

The present invention relates to a brake booster wherein fluid pressure from a pressure source is selectively communicated to a pressure chamber to provide a power assist during braking.

The prior art teaches two kinds of valve assemblies for brake boosters. In U.S. Pat. No. 4,281,585 a metering spool is movably carried within a housing bore to control the flow of fluid from a pump to a pressure chamber. The metering spool must be sealingly disposed in the housing bore to prevent leakage past any clearance between the metering spool outside diameter and the wall of the housing bore. The sealing relationship of the metering spool and the housing bore requires tight tolerance which can be difficult to maintain for a large number of parts. In U.S. Pat. No. 4,441,319 a metering poppet and stem are engageable to control fluid flow to a pressure chamber. With fluid pressure maintained in an accumulator, the metering poppet and stem are engageable to open the high fluid pressure to the pressure chamber so that a minor bump may occur during initial braking at the operator brake pedal. It is desired to combine the advantages of these two kinds of brake booster valve assemblies while also reducing any fluid leakage and pressure surges associated with the above prior art valve assemblies.

The present invention covers a brake booster comprising a housing defining a pressure chamber, an output piston exposed to the pressure chamber and movable in response to fluid pressure communicated to the pressure chamber, a valve assembly carried by the housing and an input actuator cooperating with the valve assembly to control communication of fluid pressure to the pressure chamber during braking, characterized in that said valve assembly comprises a plate-like member coupled to said input actuator for movement therewith and a cylinder slidingly engaging said plate-like member, said cylinder forming a passage leading to a pressure source and said plate-like member defining a recess leading to said pressure chamber, said plate-like member being movable during braking to align said cylinder passage with said plate-like member recess to communicate fluid pressure from said pressure source to said pressure chamber.

It is an advantage of the present invention that the plate-like member and cylinder are readily available simple parts which do not require critical tolerances for satisfactory operation.

In the drawings

Figure 1:
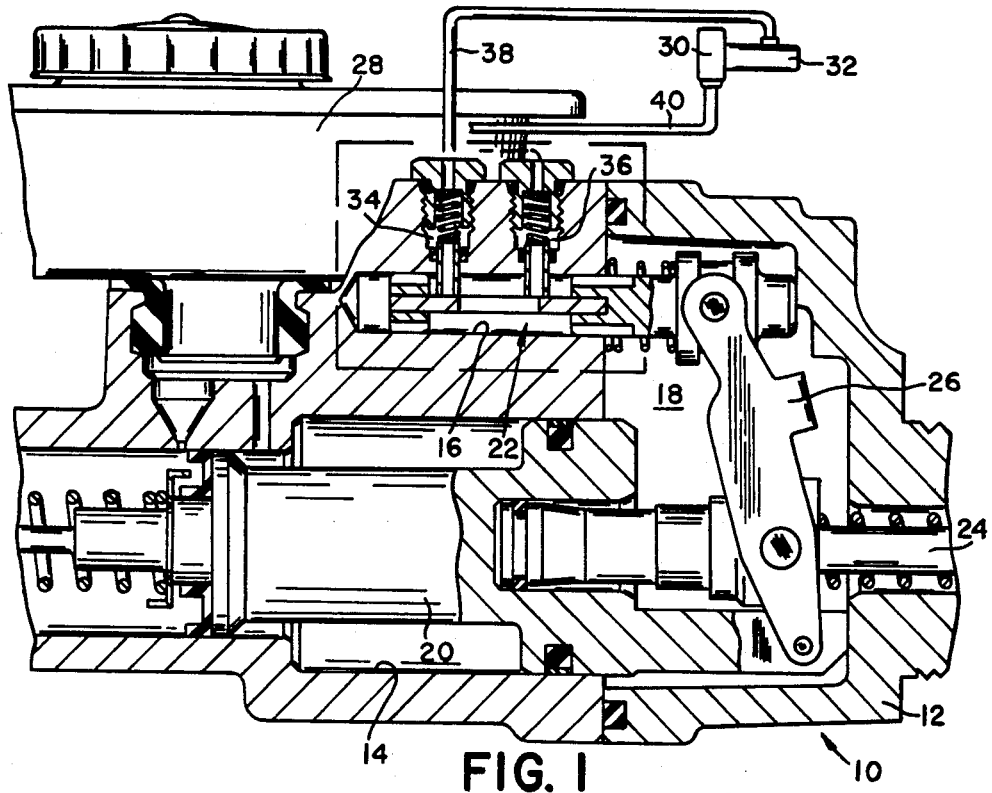
FIG. 1 is a partial cross sectional view of a hydraulic brake booster constructed in accordance with the present invention.

A brake booster 10 includes a housing 12 with a pair of bores 14 and 16 therein leading to a pressure chamber 18. An output piston 20 is movably disposed in the bore 14 and a valve assembly 22 is movably disposed in the bore 16. An input actuator 24 extends into the pressure chamber 18 and includes a lever 26 extending between the output piston 20 and the valve assembly. Although not shown the output piston 20 cooperates with a master cylinder or the like to generate fluid pressure therein during braking, and the input actuator 24 is coupled to a vehicle brake pedal for operator actuation.

The housing 12 is connected to a fluid reservoir 28 which communicates fluid to the brake booster 10 and the master cylinder. The reservoir 28 also communicates with a pump 30 and an accumulator 32 so that the pump 30 is operable to maintain a predetermined fluid pressure level in the accumulator 32. The housing bore 16 forms an intersection with an inlet port 34 and an outlet port 36. The inlet port 34 provides a fluid path from the accumulator 32 via conduit 38 to the bore 16. The outlet port 36 provides a fluid path from the bore 16 to the reservoir 28 via conduit 40.

Figure 2:
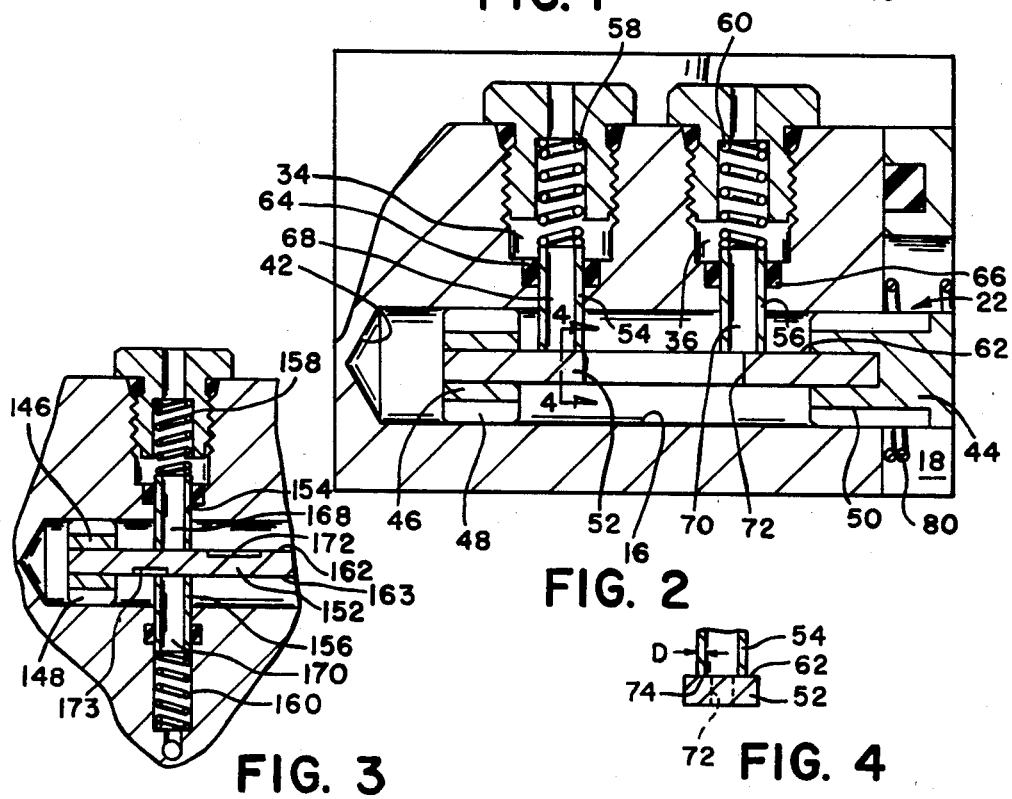
FIG. 2 is an enlarged view of the circumscribed portion 2 of FIG. 1.

Turning to FIG. 2, the valve assembly 22 is shown in a rest position spaced from an end wall 42 of bore 16. The valve assembly comprises a pair of bearings 44 and 46. Bearing 44 is connected to the lever 26 for movement therewith and both bearings 44 and 46 are provided with grooves 48 and 50, respectively, to permit free communication of fluid between the bore 16 and the pressure chamber 18. The valve assembly also comprises a plate-like member 52 attached to the pair of bearings 44 and 46 by suitable means so that the plate-like member 52 moves in unison with the pair of bearings in the bore 16. In addition, the valve assembly comprises a pair of cylinders 54 and 56 disposed in ports 34 and 36, respectively. The cylinders 54 and 56 are biased by springs 58 and 60, respectively, into engagement with a flat surface 62 on the plate-like member 52. A pair of seals 64 and 66 engage the outer surface of the cylinders 54 and 56, respectively, while the inner surface of the cylinders form passages 68 and 70 to selectively communicate the bore 16 and pressure chamber 18 with either the accumulator 32 or the reservoir 28. The plate-like member 52 is provided with a central cavity 72 which opens to passage 70 in the rest position and is spaced from passage 68. Viewing FIG. 4, the end of each cylinder is flat as shown at 74 on cylinder 54 so that the cylinder 54 and the cylinder 56 cooperate with the plate-like member 52 to prevent rotation of the latter in bore 16. In addition to the spring 58 biasing the cylinder 54 into engagement with the flat surface 62, the cylinder 54 defines a thickness D, see FIG. 4, which is exposed to the fluid pressure in the accumulator 32. This fluid pressure acts against the circumferential area defined by the thickness D to bias the cylinder 54 in the direction of the plate-like member 52 so that a tight sealing engagement exists between the end 74 and the flat surface 62 to substantially prevent leakage of fluid pressure from the passage 68 into the bore 16 and the pressure chamber 18.

During a brake application, the input actuator 24 is moved toward the output piston 20 to pivot the lever 26 counterclockwise, viewing FIG. 1. The lever 26 moves the plate-like member 52 toward the bottom wall 42 so that the cavity 72 is moved away from passage 70 to align the latter with the flat surface 62 and close passage 70 to bore 16. Immediately thereafter, the cavity 72 is brought into alignment with the passage 68 to communicate fluid pressure from the accumulator 32 to the bore 16 and the pressure chamber 18. Fluid pressure communicated to the pressure chamber 18 acts against the output piston 20 to move the latter and generate a power assist during braking. A spring 80 is provided to engage the bearing 44 and return the plate-like member to its rest position upon termination of braking.

Figure 3:
FIG. 3 is a view similar to FIG. 2 showing an alternative embodiment of the present invention.

In the alternative embodiment of FIG. 3, a cylinder 154 and a cylinder 156 oppose opposite flat surfaces 162 and 163, respectively, for a plate-like member 152. The plate-like member 152 defines recesses 172 and 173 which cooperate with the cylinders 154 and 156, respectively, in the same manner as the cavity 72 of FIG. 2.

Figure 4:
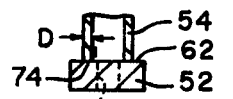
FIG. 4 is a cross section taken along line 4—4 of FIG. 2.

In both embodiments the cavity 72 and the recesses 172 and 173 can be selected from a variety of edge contours so that fluid flow from the accumulator 32 to the bore 16 will substantially eliminate an undesirable surge of fluid pressure into the pressure chamber 18. As shown in FIG. 4, the width of the cavity 72 can be smaller than the diameter of the cylinders 54 and 56 so that the cylinders will freely slide over the flat surface 62 at the location of the cavity 72.

The flat surfaces 62, 162 and 163 are lapped to define smooth surfaces and the ends of the cylinders 54 56, 154 and 156 are also lapped so that when the cylinders engage the flat surface or surfaces of the plate-like member a sealing engagement will result.

I claim:

1. A brake booster comprising a housing, a pair of spaced-apart, substantially parallel bores defined within said housing, a piston slidably mounted in one of said bores and cooperating with the housing to define a pressure chamber between the end of the piston and the housing, said pressure chamber communicating with said other bore, said other bore having a circumferentially extending wall, an inlet and an outlet extending generally radially through the circumferentially extending wall of said bore, a valve assembly slidably mounted in said other bore, said valve assembly including a plate-like member and a pair of bearings mounted on said plate-like member to support the latter in said other bore, and a pair of cylinders slidably mounted in said inlet and outlet respectively for movement generally radially with respect to the axis of said other bore, each of said cylinders defining a passage therethrough to communicate fluid between the inlet and outlet and the bore, and a recess in said plate-like member defined within a solid portion of the latter, said valve assembly being slidably mounted in said other bore and movable from a first position in which the solid portion of the plate-like member is in registry with the cylinder in the inlet and the recess is in registry with the cylinder in the outlet to thereby vent the pressure chamber, said valve assembly being movable to a second position in which the solid portion of the plate-like member is in registry with the cylinder in the outlet and the recess is in registry with the cylinder in the inlet to thereby communicate fluid pressure from the inlet to the pressure chamber through said recess and said other bore, and resilient means yieldably maintaining each of said cylinders in sliding engagement with said plate-like member, said plate-like member including a pair of bearings slidably engaging said housing and said cylinder forms an interference with said pair of bearings to limit the movement of said plate-like member relative to said housing.

2. The brake booster of claim 1, wherein said bearings are provided with grooves extending therethrough to provide a fluid path from said recess to said pressure chamber.

3. The brake booster of claim 1, wherein said inlet and outlet are spaced apart axially along said bore and the recess is elongated and is sufficiently long that one end of the recess is brought into registry with the cylinder in the outlet when the valve assembly is in the first position and the other end of said recess is brought into registry with the other end of the recess when the valve assembly is in the second position.

4. The brake booster of claim 1, wherein said cylinders in the inlet and outlet are substantially coaxial and said recess is a pair of grooves on opposite sides of the plate-like member which are brought into and out of registry with said cylinders as said plate-like member is shifted between the first and second positions.

* * * * *